United States Patent
Ishizuka et al.

(10) Patent No.: US 7,688,571 B2
(45) Date of Patent: Mar. 30, 2010

(54) SOLID ELECTROLYTIC CAPACITOR

(75) Inventors: Hidetoshi Ishizuka, Sannohe (JP);
Toshiyuki Mizutani, Sannohe (JP);
Minoru Funahashi, Sannohe (JP);
Tadayuki Echigo, Sannohe (JP)

(73) Assignee: Nichicon Corporation, Kyoto (JP)

( * ) Notice: Subject to any disclaimer, the term of this patent is extended or adjusted under 35 U.S.C. 154(b) by 241 days.

(21) Appl. No.: 11/902,694

(22) Filed: Sep. 25, 2007

(65) Prior Publication Data

US 2008/0089014 A1 Apr. 17, 2008

(30) Foreign Application Priority Data

Oct. 13, 2006 (JP) .............................. 2006-279477

(51) Int. Cl.
*H01G 4/228* (2006.01)
*H01G 9/08* (2006.01)

(52) U.S. Cl. ................... 361/540; 361/538; 361/533

(58) Field of Classification Search ............ 361/531, 361/532–533, 538, 540
See application file for complete search history.

(56) References Cited

U.S. PATENT DOCUMENTS

| | | | |
|---|---|---|---|
| 6,219,224 | B1 | 4/2001 | Honda |
| 2005/0185362 | A1 | 8/2005 | Arai et al. |
| 2006/0130301 | A1 | 6/2006 | Arai et al. |

FOREIGN PATENT DOCUMENTS

| | | | |
|---|---|---|---|
| JP | 55-056653 | A | 4/1980 |
| JP | 59-016353 | A | 1/1984 |
| JP | 02-301116 | A | 12/1990 |
| JP | 08-273983 | A | 10/1996 |
| JP | 2000-182907 | A | 6/2000 |
| JP | 2005025976 | A * | 1/2005 |
| JP | 2005-116713 | A | 4/2005 |
| JP | 2005-236090 | A | 9/2005 |
| JP | 2005-294291 | A | 10/2005 |
| JP | 2006-012612 | A | 1/2006 |
| JP | 2006-093343 | A | 4/2006 |
| JP | 2006-196498 | A | 7/2006 |

* cited by examiner

*Primary Examiner*—Eric Thomas
(74) *Attorney, Agent, or Firm*—Arent Fox LLP.

(57) ABSTRACT

A solid electrolytic capacitor includes a base substrate, a capacitor element, a metal cap, an extractor terminal and an insulating member. The base substrate has electrical conductivity. The capacitor element is provided on the base substrate. The metal cap is coupled to the base substrate and covers the capacitor element. The extractor terminal passes through the base substrate, is coupled to an anode of the capacitor element, and includes a first conductive member acting as a core member and a second conductive member covering the first conductive member. The insulating member is provided between the base substrate and the extractor terminal. Electrical conductivity of the first conductive member is higher than that of the second conductive member. Thermal expansion coefficient of the second conductive member is less than that of the insulating member.

12 Claims, 3 Drawing Sheets

SOLID ELECTROLYTIC CAPACITOR

BACKGROUND OF THE INVENTION

1. Field of the Invention

The present invention relates to a solid electrolytic capacitor.

2. Description of the Related Art

A functional polymer solid electrolytic capacitor is being noticed because the functional polymer solid electrolytic capacitor is superior to frequency characteristics compared to another electrolytic capacitor. Recently, a surface-mounted solid electrolytic capacitor is developed, the capacitor having a capacitance of a few hundreds μF, having ESR (Equivalent Series Resistance) lower than 5 mΩ in 100 kHz frequency range and having ESL (Equivalent Series Inductance) of approximately 1 pH in 10 MHz frequency range. The solid electrolytic capacitor is suitable for a decoupling circuit of a power supply line to be coupled to a CPU (Central Processing Unit). A high capacitance capacitor, in which a plurality of solid electrolytic capacitors are stacked and coupled in parallel, is developed.

These solid electrolytic capacitors are surface-mounted capacitors suitable for a power supply line such as a personal computer, a server or the like of which speed and frequency get higher. An exterior of the solid electrolytic capacitor is, generally, molded with epoxy resin. There is, however, some defects with respect to the epoxy resin molding.

Transfer molding is, generally, used as an epoxy resin molding method. The epoxy resin is heated to more than 150 degrees C. and the epoxy resin is put into with a pressure of more than few atmospheres, in the method. A capacitor element is subjected to much stress. This results in increase of a leakage current and generation of electrical short circuit. The epoxy resin of high temperature breaks into between electrode foils of the capacitor element. And the characteristic is possibly degraded because of separation of a polymer of the capacitor element.

The epoxy resin used as the exterior mold includes filler for increasing a filling density of the epoxy resin. There are many voids on molecular level. This results in a defect with respect to humidity resistance. A package crack may be generated because of a heating during mounting, in a case of exterior cladding with the epoxy resin. It is necessary that the thickness is more than a given value in proportion to an exterior size in order to avoid the generation of the package crack. It is therefore not possible to obtain a super slim package.

And so, Japanese Patent Application Publication No. 2005-116713 (hereinafter referred to as Document 1) discloses a molding method as a method other than the transfer molding. In the method, a thermocompression tape where a single liquid epoxy resin is impregnated is pasted to a polymerized element. And the epoxy resin dissolved with heat is molded. It is, however, difficult to obtain humidity resistance because an exterior molding material is epoxy resin, with respect to a solid electrolytic capacitor manufactured following the art of Document 1.

And so, the capacitor element may be covered with a metal case. In this case, it is possible to improve the humidity resistance of the solid electrolytic capacitor. It is, however, necessary to improve the humidity resistance and reduce the ESR for purpose.

SUMMARY OF THE INVENTION

The present invention has been made in view of the above circumstances and provides a solid electrolytic capacitor having high humidity resistance and low ESR.

According to an aspect of the present invention, there is provided a solid electrolytic capacitor including a base substrate, a capacitor element, a metal cap, an extractor terminal and an insulating member. The base substrate has electrical conductivity. The capacitor element is provided on the base substrate. The metal cap is coupled to the base substrate and covers the capacitor element. The extractor terminal passes through the base substrate, is coupled to an anode of the capacitor element, and includes a first conductive member acting as a core member and a second conductive member covering the first conductive member. The insulating member is provided between the base substrate and the extractor terminal. Electrical conductivity of the first conductive member is higher than that of the second conductive member. Thermal expansion coefficient of the second conductive member is less than that of the insulating member.

With the above-mentioned configuration, the electrical resistance of the extractor terminal is reduced, because the extractor terminal has the core member that is made of the first conductive member having electrical conductivity higher than that of the second conductive member. It is therefore possible to reduce the ESR of the solid electrolytic capacitor in accordance with the present invention. And it is possible to keep sealing property at the extractor terminal, because the second conductive member has thermal expansion coefficient lower than that of the insulating member. It is therefore possible to restrain the reduction of humidity resistance of the solid electrolytic capacitor in accordance with the present invention. Accordingly, the solid electrolytic capacitor in accordance with the present invention has both low ESR and high humidity resistance.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given, with reference to the accompanying drawings, of embodiments of the present invention.

First Embodiment

Figure 1A:
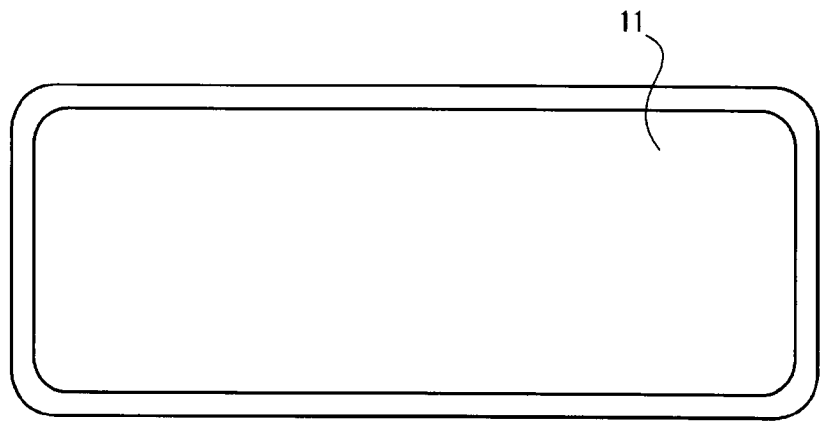
FIG. 1A through FIG. 1C illustrate a solid electrolytic capacitor in accordance with a first embodiment of the present invention.
Figure 1B:
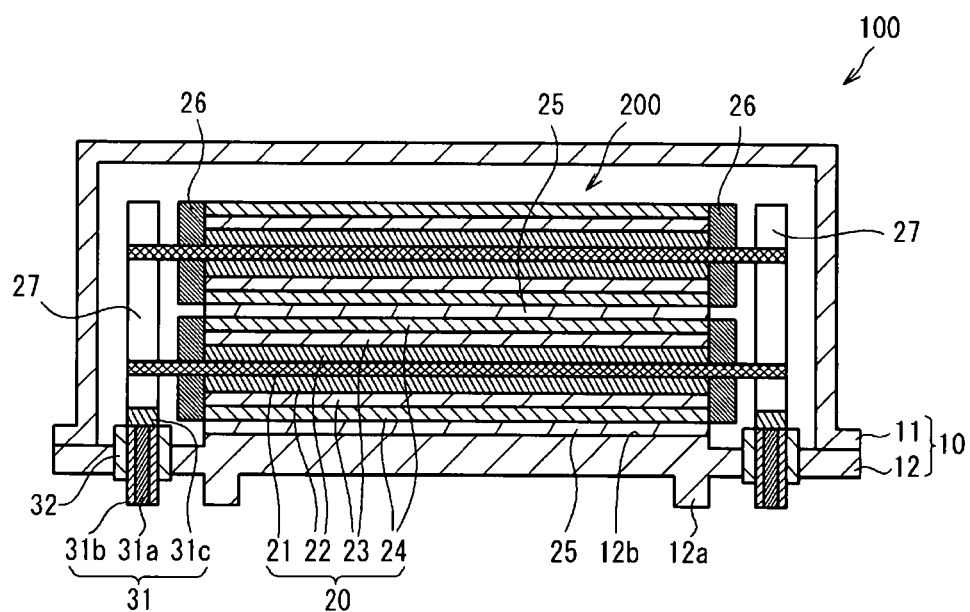
Figure 1C:
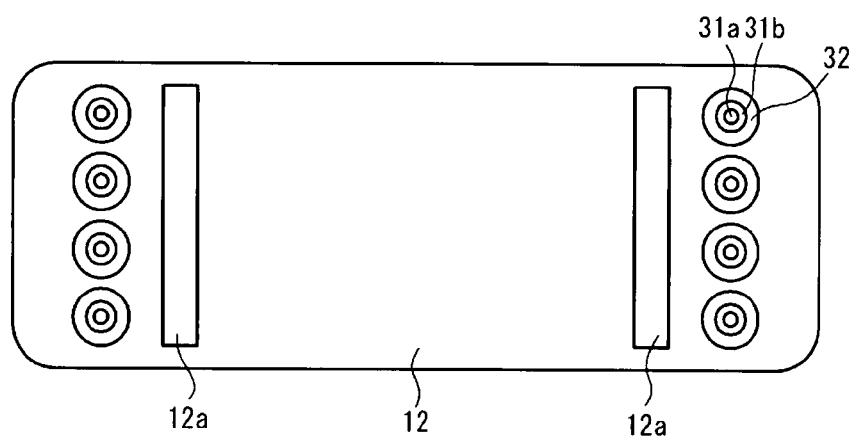

FIG. 1A through FIG. 1C illustrate a solid electrolytic capacitor 100 in accordance with a first embodiment of the present invention. FIG. 1A illustrates a top view of the solid electrolytic capacitor 100. FIG. 1B illustrates a cross sectional view of the solid electrolytic capacitor 100. FIG. 1C illustrates a bottom view of the solid electrolytic capacitor 100. The solid electrolytic capacitor 100 is a surface-mounted type of a solid electrolytic capacitor.

As shown in FIG. 1B, the solid electrolytic capacitor 100 has a structure in which a capacitor element 200 is packed in a case 10. The case 10 has a structure in which a metal cap 11 is provided on a base substrate 12. The metal cap 11 may be sealed to the base substrate 12 with a projection welding method or the like. The metal cap 11 is made of a metal such as copper, aluminum, SPC steel, cobalt steel or stainless steel.

The base substrate 12 is made of a conductive material having low moisture permeability. The base substrate 12 is, for example, made of a metal such as copper, aluminum, SPC steel, cobalt steel or stainless steel, or a ceramics having a metal layer plated on the surface thereof. It is preferable that the base substrate 12 is made of a material to be soldered easily. The base substrate 12 may be, for example, made of SPC steel having electroless nickel and electrolytic gold coated on a surface thereof. An insulating layer (not shown) may be coated on an inner face of the metal cap 11, because an electrical short is restrained between the capacitor element 200 and the metal cap 11.

The solid electrolytic capacitor 100 in accordance with the embodiment has a high humidity resistance, because the capacitor element 200 is sealed with the metal cap 11 and the base substrate 12 that have high sealing performance and have high shielding against external environment. It is therefore possible to restrain characteristics degradation of the solid electrolytic capacitor 100.

As shown in FIG. 1B and FIG. 1C, through holes are formed near both ends of the base substrate 12. An extractor terminal 31 is provided in each of the through holes. An insulating member 32 is formed between the extractor terminal 31 and the through hole. And it is possible to restrain an electrical short between the extractor terminal 31 and the base substrate 12.

The insulating member 32 is, for example, made of a glass such as a hard glass or a soft glass, or a rubber. The insulating member 32 is, preferably, made of a soft glass, in a case where the base substrate 12 is made of a material such as SPC steel having relatively high thermal expansion coefficient. On the other hand, the insulating member 32 is, preferably, made of a hard glass, in a case where the base substrate 12 is made of a material such as cobalt steel having relatively low thermal expansion coefficient. In these cases, it is possible to improve sealing performance of the case 10. And it is preferable that the insulating member 32 is made of the soft glass from a viewpoint of cost.

As shown in FIG. 1B and FIG. 1C, the extractor terminal 31 includes a core member 31a that has an electrical conductivity and a cover member 31b that has an electrical conductivity and covers the core member 31a in a length direction of the core member 31a. The electrical conductivity of the core member 31a is higher than that of the cover member 31b. The thermal expansion coefficient of the cover member 31b is lower than that of the insulating member 32. The extractor terminal 31 is coupled to an extractor portion of an anode foil 21 mentioned later. The extractor terminal 31 thus acts as an anode terminal.

Here, the sealing property at the extractor terminal 31 is degraded, in a case where the extractor terminal 31 is made of a material having a thermal expansion coefficient higher than that of the insulating member 32. For example, the sealing property of the solid electrolytic capacitor 100 is degraded because of a differential of the thermal expansion coefficient when the insulating member 32 made of glass is melted and hardened. This results in reduction of the humidity resistance of the solid electrolytic capacitor 100. Here, there is a case where the extractor terminal 31 is made of a material having the thermal expansion coefficient lower than that of the insulating member 32. The electrical resistance of the extractor terminal 31 is, however, increased, because a general conductive material does not have both low thermal expansion coefficient and high electrical conductivity. As a result, ESR of the solid electrolytic capacitor 100 is increased.

However, with the structure in accordance with the embodiment, it is possible to reduce the electrical resistance of the extractor terminal 31, because the core member 31a is made of the material having the electrical conductivity higher than that of the cover member 31b. It is therefore possible to reduce the ESR of the solid electrolytic capacitor 100. Further, it is possible to keep the sealing property at the extractor terminal 31, because the thermal expansion coefficient of the cover member 31b is lower than that of the insulating member 32. It is therefore possible to restrain the reduction of the humidity resistance of the solid electrolytic capacitor 100. Accordingly, the solid electrolytic capacitor 100 has both low ESR and high humidity resistance.

Table 1 shows combinations of a material to be used as the core member 31a, a material to be used as the cover member 31b, and a material to be used as the insulating member 32. With the combination shown in Table 1, it is possible to reduce the ESR in a frequency range at 100 kHz. And, Table 2 shows another material to be used as the core member 31a. It is preferable to use pure copper, copper alloy or aluminum as the core member 31a, because gold and silver is relatively expensive.

TABLE 1

| | Member | Material | Thermal expansion coefficient (1/K) | Electrical resistance (Ωm) | Composition |
| --- | --- | --- | --- | --- | --- |
| Combination 1 | core member 31a | pure copper | $138 \times 10^{-7}$ | $1.67 \times 10^{-8}$ | Cu |
| | cover member 31b | nickel-iron alloy | $95 \times 10^{-7}$ | $50 \times 10^{-8}$ | Fe 50 wt % Ni 50 wt % |
| | insulating member 32 | soft glass | $95 \times 10^{-7}$ | — | $SiO_2$ (70 wt %) $B_2O_3$ (10 wt %) $Al_2O_3$ (4 wt %) |
| Combination 2 | core member 31a | pure copper | $138 \times 10^{-7}$ | $1.67 \times 10^{-8}$ | Cu |
| | cover member 31b | kovar | $50 \times 10^{-7}$ | $49 \times 10^{-8}$ | Zn (27 wt %) Ni (18 wt %) Co (55 wt %) |
| | insulating member 32 | hard glass | $50 \times 10^{-7}$ | — | $SiO_2$ (65 wt %) $B_2O_3$ (20 wt %) $Al_2O_3$ (6 wt %) |

TABLE 1-continued

| | Member | Material | Thermal expansion coefficient (1/K) | Electrical resistance (Ωm) | Composition |
|---|---|---|---|---|---|
| Combination 3 | core member 31a | pure copper | $138 \times 10^{-7}$ | $1.67 \times 10^{-8}$ | Cu |
| | cover member 31b | kovar | $50 \times 10^{-7}$ | $49 \times 10^{-8}$ | Zn (27 wt %) Ni (18 wt %) Co (55 wt %) |
| | insulating member 32 | soft glass | $95 \times 10^{-7}$ | — | $SiO_2$ (70 wt %) $B_2O_3$ (10 wt %) $Al_2O_3$ (4 wt %) |

TABLE 2

| Material | Electrical resistance (Ωm) | Composition |
|---|---|---|
| pure copper | $1.67 \times 10^{-8}$ | Cu |
| brass | $6.2 \times 10^{-8}$ | 60Cu40Zn |
| phosphor bronze | $9.6 \times 10^{-8}$ | Cu—8Sn—0.2P |
| beryllium bronze | $6.5 \times 10^{-8}$ | Cu—2Be—0.5Co |
| aluminum | $2.6 \times 10^{-8}$ | Al |
| gold | $2.35 \times 10^{-8}$ | Au |
| silver | $1.59 \times 10^{-8}$ | Ag |

Adhesiveness is increased between the cover member 31b and the insulating member 32 in a case where kovar is used as the cover member 31b and a hard glass is used as the insulating member 32, because adhesiveness between the kovar and the hard glass is high. It is preferable that the core member 31a is jointed to the cover member 31b. For example, it is preferable that the core member 31a is jointed to the cover member 31b with a cold jointing, a diffusion jointing or the like, because contact resistance is reduced between the core member 31a and the cover member 31b.

It is preferable that the core member 31a is jointed to the cover member 31b metallurgically. It is possible to joint the core member 31a to the cover member 31b metallurgically with a melting process of the material composing the core member 31a and the material composing the cover member 31b and a hot jointing process of each material. In this case, it is possible to further reduce the contact resistance between the core member 31a and the cover member 31b. It is preferable that the extractor terminal 31 is can be soldered easily. It is therefore preferable that the surface of the extractor terminal 31 is coated with electroless nickel and electrolytic gold.

The base substrate 12 has a plurality of convex portions 12a on a bottom face thereof. Each of the convex portions 12a acts as a cathode terminal, as mentioned later. It is therefore possible to form wiring pattern under the base substrate 12. And it is possible to prevent displacement of the solid electrolytic capacitor 100 when mounted, because a plurality of the convex portions 12a are provided. Mountability of the solid electrolytic capacitor 100 is therefore improved. The convex portion 12a may be provided only at a necessary position, because a part of the bottom face of the base substrate 12 is not used as the cathode terminal. It is therefore possible to reduce the weight of the base substrate 12.

The base substrate 12 has a convex portion 12b on a side of the capacitor element 200. The convex portion 12b is a plane-shaped region where the capacitor element 200 is to be mounted. It is possible to adhere the capacitor element 200 to the base substrate 12 with adhesive agent, because the region where the capacitor element 200 is to be mounted has a plane shape.

Figure 2A:
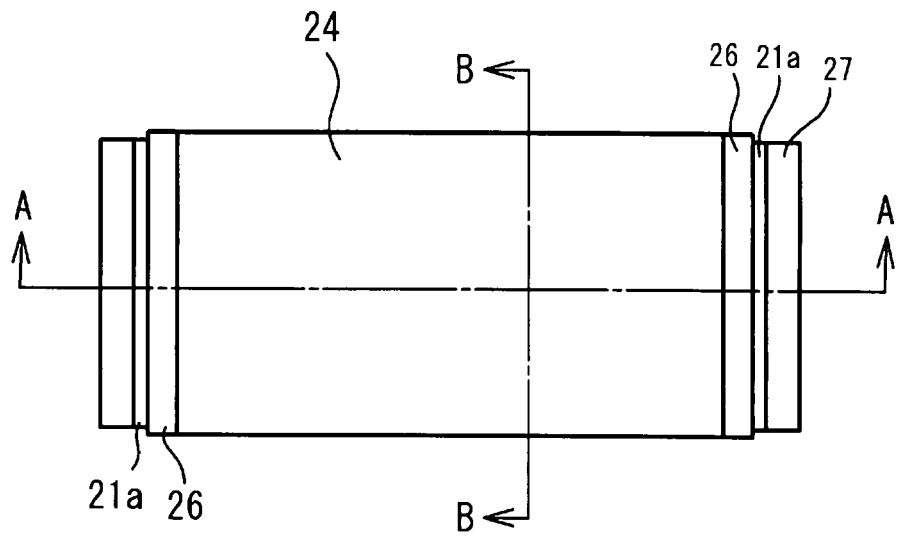
FIG. 2A through FIG. 2C illustrate details of a capacitor element.
Figure 2B:
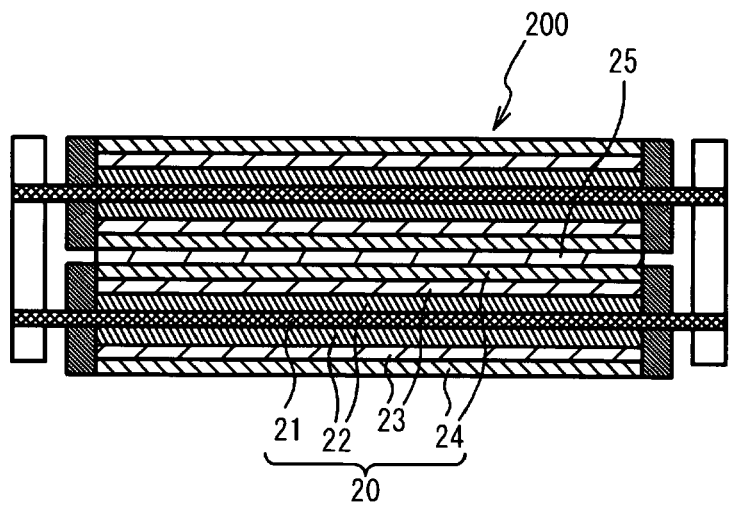
Figure 2C:
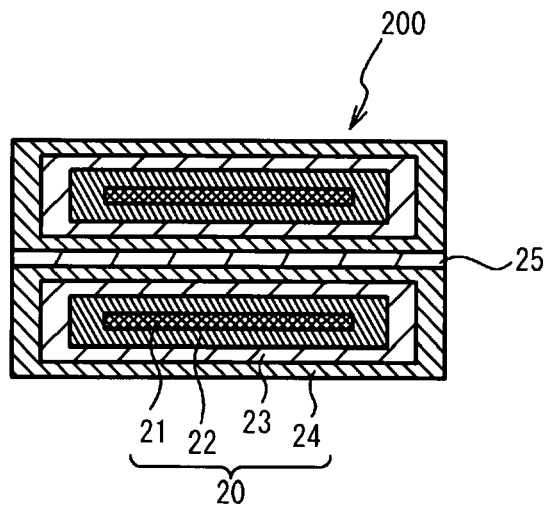

Next, a description will be given of the capacitor element 200, with reference to FIG. 2A through FIG. 2C. FIG. 2A illustrates a top view of the capacitor element 200. FIG. 2B illustrates a cross sectional view of the capacitor element 200 taken along a line A-A of FIG. 2A. FIG. 2C illustrates a cross sectional view of the capacitor element 200 taken along a line B-B of FIG. 2A. As shown in FIG. 2B and FIG. 2C, the capacitor element 200 has a structure in which a plurality of unit elements 20 are stacked. In the capacitor element 200 in accordance with the embodiment, two of the unit elements 20 are stacked on the base substrate 12 with a conductive adhesive agent 25. It is possible to control the capacitance of the capacitor element 200 by controlling the stacking number of the unit element 20.

The adhesive agent 25 is made of a conductive material such as silver. The unit element 20 has a structure in which a solid electrolyte layer 22, a carbon paste layer 23 and an extractor cathode layer 24 are stacked on whole of the anode foil 21 in order. The anode foil 21 is made of a valve metal having a dielectric oxide layer formed on a surface thereof. The valve metal used for the anode foil 21 is a metal such as aluminum. It is possible to form the dielectric oxide layer by subjecting the surface of the valve metal to an etching treatment and a chemical conversion treatment.

It is possible to form the anode foil 21 by cutting a valve metal having a dielectric oxide layer formed on a surface thereof into a given shape. In the cutting process, the valve metal at the end face of the anode foil 21 is exposed, and a defect is formed in the dielectric oxide layer. It is therefore necessary to form a dielectric oxide layer on the exposed valve metal. It is possible to form the dielectric oxide layer on the exposed valve metal by carrying out a chemical conversion treatment and a thermal treatment few times after the cutting. The chemical conversion treatment is carried out at a voltage near a formation voltage of the dielectric oxide layer, using chemical liquid mainly containing 0.5 wt % to 2 wt % ammonium adipate. The thermal treatment is, for example, carried out in a temperature range of 200 degrees C. to 400 degrees C.

The solid electrolyte layer 22 is made of functional polymer and is formed on a surface of the anode foil 21. The functional polymer solid electrolyte is made of 3,4-polyethylene dioxythiophene (PEDT) or the like. It is possible to form the functional polymer solid electrolyte by impregnating polymerizable monomers and an oxidizer into the anode foil. A description will be given of a forming method of the solid electrolyte.

A compound liquid including a monomer to be the solid electrolyte and an oxidizer is impregnated into the anode foil 21. The monomer is a compound solvent including a volatile solvent. Concentration of the monomer in the compound solvent is within a range 1 wt % to 50 wt %. The concentration is, preferably, within a range 10 wt % to 35 wt %. The oxidizer is contained in an alcohol solvent by 40 wt % to 60 wt %. In the embodiment, a solvent containing 60 wt % oxidizer is used. Next, the compound liquid impregnated into the anode foil is subjected to a heat polymerization, and the solid electrolyte layer 22 is formed.

In addition, an insulating layer 26 is formed on an exposed area of the solid electrolyte layer 22 as shown in FIG. 2A and FIG. 2B. And it is prevented that the solid electrolyte exudes from the solid electrolyte layer 22. The insulating layer 26 is, for example, made of an insulating synthetic resin such as silicon resin, epoxy resin, polyamide resin, polyimide resin or the like.

The extractor cathode layer 24 is, for example, made of silver paste. In the embodiment, the extractor cathode layer 24 of the unit element 20 at lower side is electrically coupled to the base substrate 12 with the adhesive agent 25. And the base substrate 12 and the metal cap 11 act as a cathode. The case 10 therefore acts as a cathode totally. Accordingly, it is possible to reduce ESL of the solid electrolytic capacitor 100.

Each of the anode foils 21 has an anodic lead portion 21$a$ at both ends thereof. The anodic lead portion 21$a$ of each of the unit elements 20 is coupled to each other through a stripe-shaped metal board 27 with a welding. The stripe-shaped metal board of bottom position is coupled to the extractor terminal 31 with a laser welding or the like.

Figure 3:
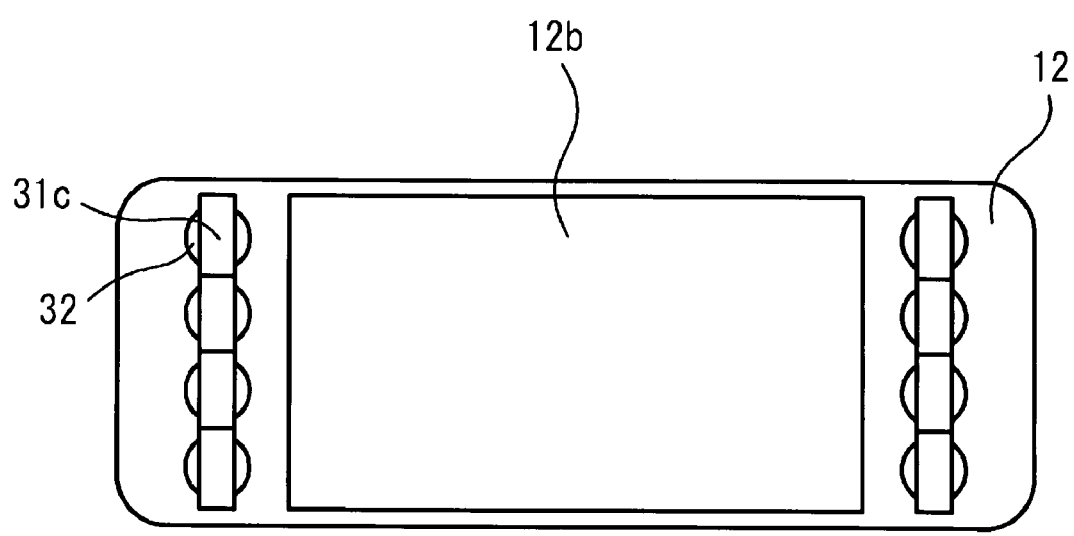
FIG. 3 illustrates a top view of a base substrate.

Next, a description will be given of a position and a shape of the extractor terminal 31. FIG. 3 illustrates a top view of the base substrate 12. As shown in FIG. 3, a plurality of the extractor terminals 31 are provided at both end portions of the base substrate 12. The extractor terminal 31 has a contact portion 31$c$ on the capacitor element 200 side. The contact portion 31$c$ has a cross sectional area larger than that of a main body of the extractor terminal 31. It is therefore possible to reduce the contact resistance between the anodic lead portion 21$a$ and the extractor terminal 31. This results in reduction of ESR. And it is possible to adhere the extractor terminal 31 to the strip-shaped metal board 27 with an adhesive agent.

As shown in FIG. 3, it is preferable that an area formed by the contact portions 31$c$ is substantially as same as that of the strip-shaped metal board 27, because the contact area between the extractor terminal 31 and the strip-shaped metal board 27 is the maximum. In this case, it is possible to reduce the contact resistance between the extractor terminal 31 and the strip-shaped metal board 27. The contact portion 31$c$ may be formed by crushing the end portion of the extractor terminal 31 at the capacitor element 200 side.

In the embodiment, the core member 31$a$ corresponds to the first conductive member, and the cover member 31$b$ corresponds to the second conductive member.

EXAMPLES

The solid electrolytic capacitor in accordance with the above-mentioned embodiment was fabricated. The characteristics were investigated.

Example

In Example, the solid electrolytic capacitor 100 shown in FIG. 1A through FIG. 1C was fabricated. The conductive adhesive agent 25 was made of adhesive silver paste. The base substrate 12 was made of SPC steel having electroless nickel and electrolytic gold coated on a surface thereof. The insulating member 32 was made of a soft glass that is soda-barium-based material and has thermal expansion coefficient of $95 \times 10^{-7}$ (1/K).

The cover member 31$b$ was made of nickel-iron alloy including 50 wt % iron and 50 wt % nickel, and had thermal expansion coefficient and the electrical resistance of $95 \times 10^{-7}$ (1/K) and $50 \times 10^{-8}$ Ωm respectively. The core member 31$a$ was made of pure copper having electrical resistance of $1.67 \times 10^{-8}$ Ωm. The extractor terminal 31 was made with an extracting process of melted copper and melted nickel-iron alloy and a hot-jointing process of the copper and the nickel-iron. Electroless nickel and electrolytic gold were coated on the surface of the cover member 31$b$. The diameter of the core member 31$a$ was 0.39 mm. The diameter of the extractor terminal 31 was 1 mm.

The metal cap 11 was made of a metal having electrolytic nickel-iron coated on the surface thereof. The metal cap 11 was welded to the base substrate 12 with a projection welding method, and the solid electrolytic capacitor 100 was sealed. In the capacitor element 200 in accordance with Example, four unit elements 20 were stacked. The solid electrolytic capacitor in accordance with Example had capacitance of 2.5 V 1000 μF.

Comparative Example

In Comparative example, the above-mentioned nickel-iron alloy was used as an extractor terminal. In comparative example, the extractor terminal did not include a core member made of another material. The other structure was as same as Example. The solid electrolytic capacitor in accordance with Comparative example had capacitance of 2.5 V 1000 μF.

(Analysis)

Table 3 shows electrical capacitance, tan δ, leakage current, and the ESR of the solid electrolytic capacitors in accordance with Example and Comparative example. Thirty capacitors in accordance with Example and Comparative example were fabricated, and each value in Table 3 shows average value thereof.

TABLE 3

|  | Electrical capacitance (μF) | tanδ (%) | Leakage current (μA/2 minutes) | ESR (mΩ) |
|---|---|---|---|---|
| Example | 989 | 0.9 | 138 | 1.6 |
| Comparative example | 994 | 1.0 | 146 | 2.1 |

As shown in Table 3, with respect to the solid electrolytic capacitor in accordance with Example, the ESR is reduced considerably, compared to the solid electrolytic capacitor in accordance with Comparative example. This may be because the electrical resistance of the extractor terminal was reduced because of the core member having high conductivity. In addition, with respect to the solid electrolytic capacitor in accordance with Example, the electrical capacitance is large, the tanδ is low, and the leakage current is small.

The present invention is not limited to the specifically disclosed embodiments, but include other embodiments and variations without departing from the scope of the present invention.

The present application is based on Japanese Patent Application No. 2006-279477 filed on Oct. 13, 2006, the entire disclosure of which is hereby incorporated by reference.

What is claimed is:

1. A solid electrolytic capacitor comprising:
a base substrate having electrical conductivity;
a capacitor element that is provided on the base substrate;
a metal cap that is coupled to the base substrate and covers the capacitor element;
an extractor terminal that passes through the base substrate, is coupled to an anode of the capacitor element, and includes a first conductive member acting as a core member and a second conductive member covering the first conductive member; and
an insulating member that is provided between the base substrate and the extractor terminal,
wherein:
electrical conductivity of the first conductive member is higher than that of the second conductive member;
thermal expansion coefficient of the second conductive member is less than that of the insulating member;
the base substrate has a plurality of convex portions acting as a cathode terminal; and
a region between the convex portions has a concave shape.

2. The solid electrolytic capacitor as claimed in claim 1, wherein the first conductive member is jointed to the second conductive member.

3. The solid electrolytic capacitor as claimed in claim 2, wherein the first conductive member is metallurgically jointed to the second conductive member.

4. The solid electrolytic capacitor as claimed in claim 1, wherein a plurality of the extractor terminals are provided.

5. The solid electrolytic capacitor as claimed in claim 1, wherein an area of the extractor terminal gets larger at a contact portion contacting with the anode of the capacitor element.

6. The solid electrolytic capacitor as claimed in claim 1, wherein the first conductive member is made of copper or copper alloy.

7. The solid electrolytic capacitor as claimed in claim 1, wherein the insulating member is made of a soft glass or a hard glass.

8. The solid electrolytic capacitor as claimed in claim 1, wherein:
the first conductive member is made of copper;
the second conductive member is made of nickel-iron alloy; and
the insulating member is made of a soft glass.

9. The solid electrolytic capacitor as claimed in claim 1, wherein the base substrate, the metal cap and a cathode of the capacitor element are electrically conducted to each other.

10. The solid electrolytic capacitor as claimed in claim 9, wherein the metal cap is welded to the base substrate.

11. The solid electrolytic capacitor as claimed in claim 1, wherein the capacitor element has a unit element in which a functional polymer solid electrolytic layer, carbon paste and a cathode layer are formed on a surface of an anode foil made of a valve metal.

12. The solid electrolytic capacitor as claimed in claim 11, wherein:
the capacitor element has a structure in which a plurality of the unit elements are stacked; and
a cathode layer of the unit elements at a bottom position is electrically conducted to the base substrate.

* * * * *